(12) United States Patent
Fines

(10) Patent No.: US 12,447,783 B2
(45) Date of Patent: Oct. 21, 2025

(54) HITCH APPARATUS AND METHOD

(71) Applicant: Casey Fines, West Fargo, ND (US)

(72) Inventor: Casey Fines, West Fargo, ND (US)

( * ) Notice: Subject to any disclaimer, the term of this patent is extended or adjusted under 35 U.S.C. 154(b) by 491 days.

(21) Appl. No.: 18/086,614

(22) Filed: Dec. 21, 2022

(65) Prior Publication Data
US 2024/0208285 A1    Jun. 27, 2024

(51) Int. Cl.
B60D 1/46    (2006.01)
(52) U.S. Cl.
CPC ...................... B60D 1/46 (2013.01)
(58) Field of Classification Search
CPC .................... B60D 1/40; B60D 1/46
See application file for complete search history.

(56) References Cited

U.S. PATENT DOCUMENTS

| | | | | |
|---|---|---|---|---|
| 6,974,146 B2* | 12/2005 | Abair | ...................... | B60D 1/36 280/491.2 |
| 11,752,815 B2* | 9/2023 | McAllister | ............. | B60D 1/248 177/136 |
| 12,083,839 B2* | 9/2024 | Smith | ...................... | B60D 1/62 |
| 2006/0163841 A1* | 7/2006 | Krstovic | .................. | B60D 1/40 280/478.1 |
| 2024/0010037 A1* | 1/2024 | Fines | ...................... | B60D 1/485 |
| 2024/0208285 A1* | 6/2024 | Fines | ...................... | B60D 1/46 |
| 2025/0083481 A1* | 3/2025 | Cannon | .................... | B62D 9/00 |

* cited by examiner

Primary Examiner — Kevin Hurley
(74) Attorney, Agent, or Firm — Darryl Edwin Scott

(57) ABSTRACT

An apparatus includes a hitch arm having a cross member having a first end and a second end. A first hitch member is adjacently coupled to the first end. A second hitch member is adjacently coupled to the second end. A hitch receiver is coupled to the cross member. The apparatus includes a first hitch frame and a second hitch frame. A first drive system is mechanically coupled to the hitch arm and to the first hitch frame. A second drive system is coupled to the hitch arm and to the second hitch frame.

9 Claims, 9 Drawing Sheets

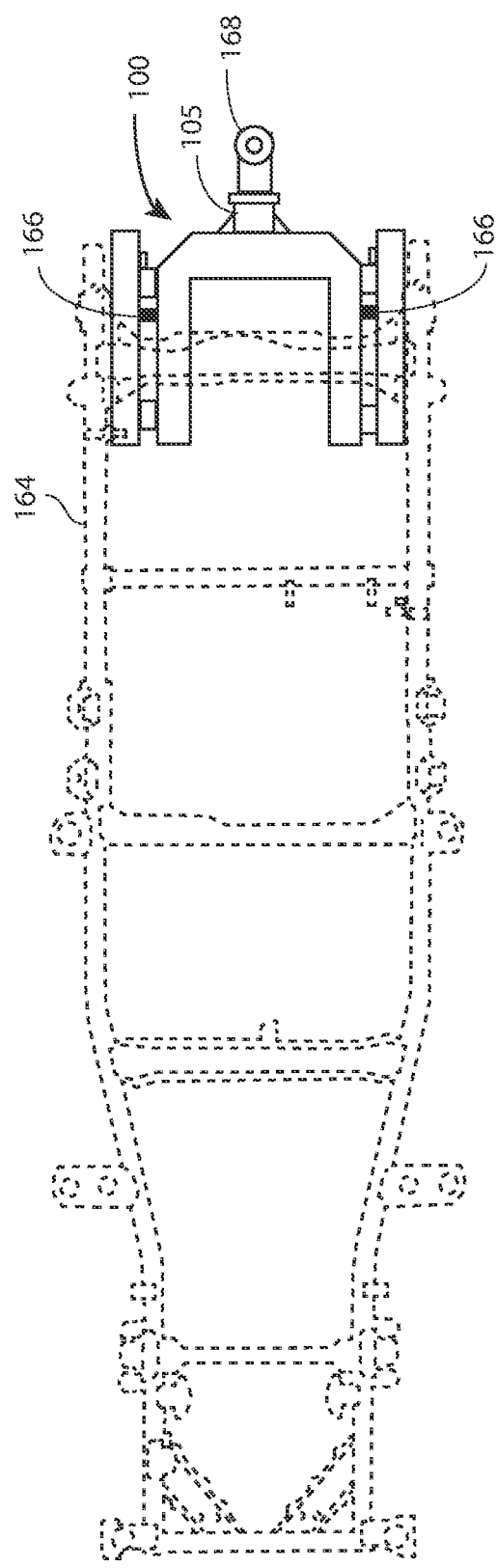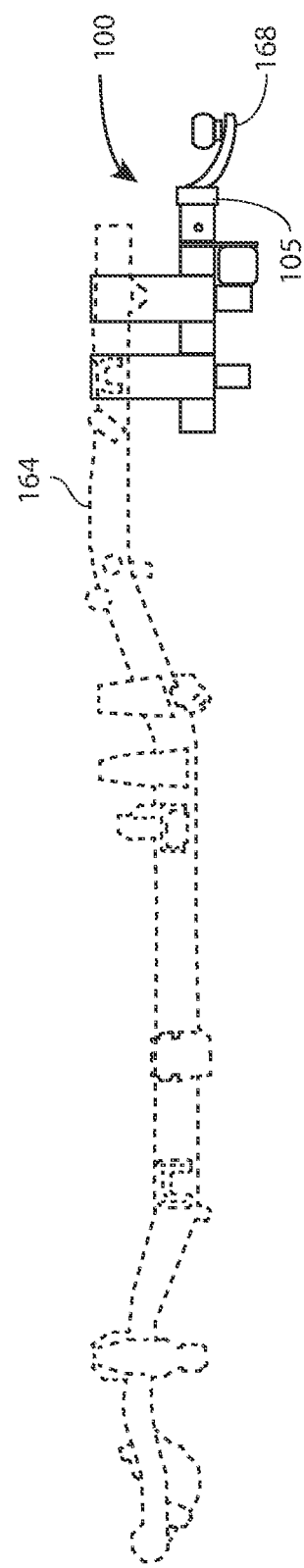

HITCH APPARATUS AND METHOD

BACKGROUND

Coupling a trailer hitch to a trailer requires an individual to meticulously align a trailer ball to a trailer coupler. Aligning and coupling these two objects together requires the trailer ball to be horizontally and vertically aligned such that the trailer coupler can be lowered onto the trailer ball. For example, the trailer may need to be ratcheted vertically above the trailer ball and then subsequently ratcheted down onto the trailer ball. This method is cumbersome, especially if the trailer is loaded with heavy material. Once the trailer is ratcheted into the correct height, the vehicle having the trailer hitch must be reversed in line with the trailer coupler. In most cases, this requires two individuals to aid in aligning the trailer ball to the trailer coupling. In addition, these steps may be performed during extreme environmental conditions, such as extreme heat, extreme cold, or during storms which adds additional challenges when trying to quickly couple a trailer hitch to a trailer. Coupling a trailer hitch to a trailer coupler is a challenge.

BRIEF DESCRIPTION OF THE DRAWINGS

FIG. 7 is an aerial view of a hitch apparatus coupled to a vehicle frame.

FIG. 8 is a profile view of a hitch apparatus coupled to a vehicle frame.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Coupling a trailer hitch to a trailer requires an individual to meticulously align a trailer ball to a trailer coupler. Executing this connection requires numerous steps that may require two or more individuals to accomplish. The goal is to maneuver the trailer ball into the correct horizontal and vertical position such that the trailer coupler can be lowered onto the trailer ball. First, the trailer may need to be ratcheted vertically above the trailer ball. This may be cumbersome, especially if the trailer has a heavy load. Next, a vehicle having the trailer hitch is reversed towards the trailer coupler to begin the coupling process. Once the trailer hitch is aligned with the trailer coupler, the trailer is ratcheted down such that the trailer coupler is lowered onto the trailer ball. Additional steps may include connecting the trailer wiring harness and safety chains. Further, these steps may be performed during extreme environmental conditions, such as extreme heat, extreme cold, or during storms which adds additional challenges when trying to quickly couple a trailer hitch to a trailer coupler.

The embodiments described herein provides an apparatus that allows a trailer ball to be mechanically coupled to a trailer coupler without the need to ratchet the trailer in the correct vertical position. Specifically, the embodiments describe an automated hitch apparatus. With the aid of rear-view camera systems now required in all modern vehicles in the United States, positioning the hitch apparatus to a trailer coupler reduces the need for the individual to spend a lot of time in the elements to manually connect the trailer hitch and trailer. With the use of the hitch apparatus, the individual will only need to leave their vehicle to lock the trailer coupler handle, secure the trailer wiring harness, and connect the safety chains.

Figure 1:
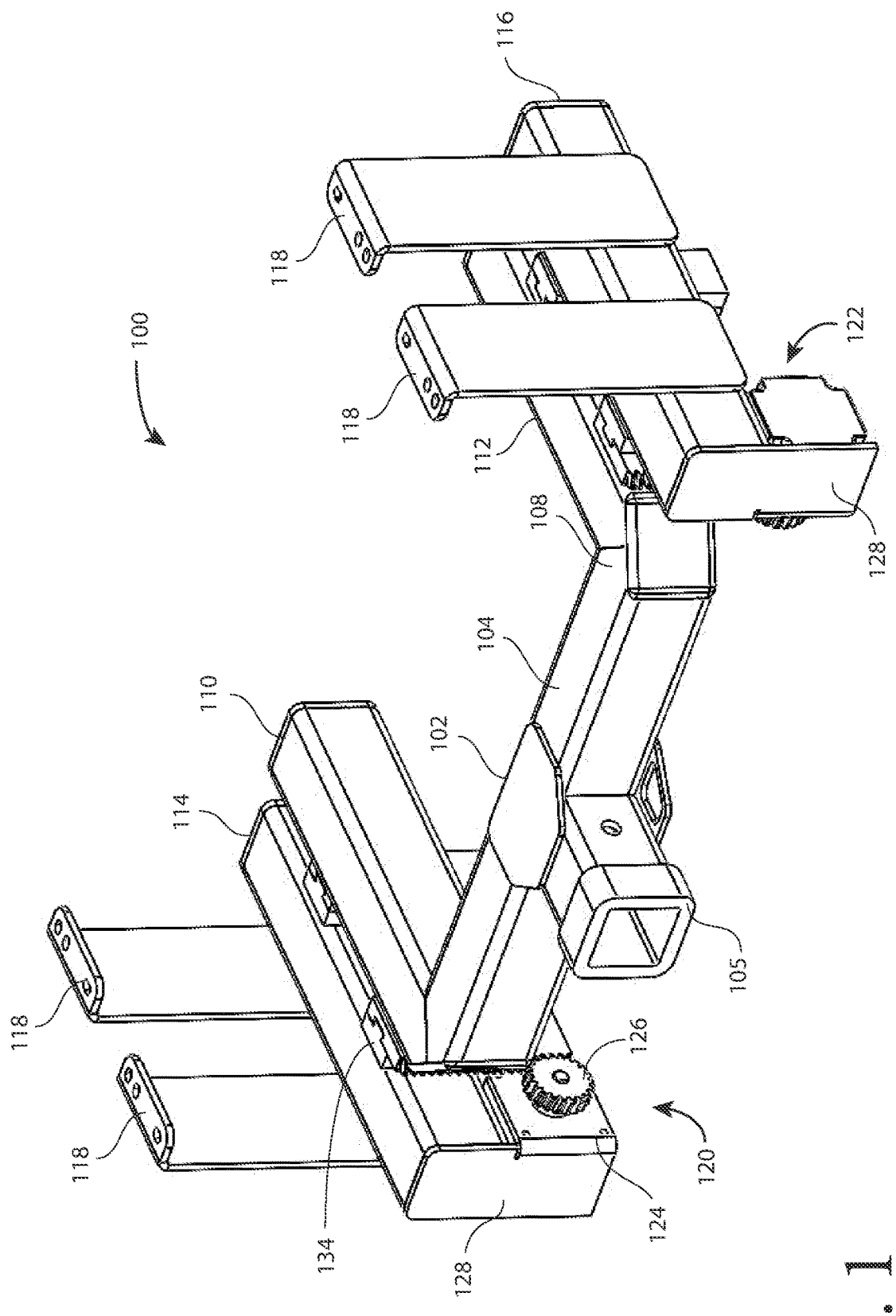
FIG. 1 is a perspective view of a hitch apparatus having a motor in an engaged position.
Figure 2:
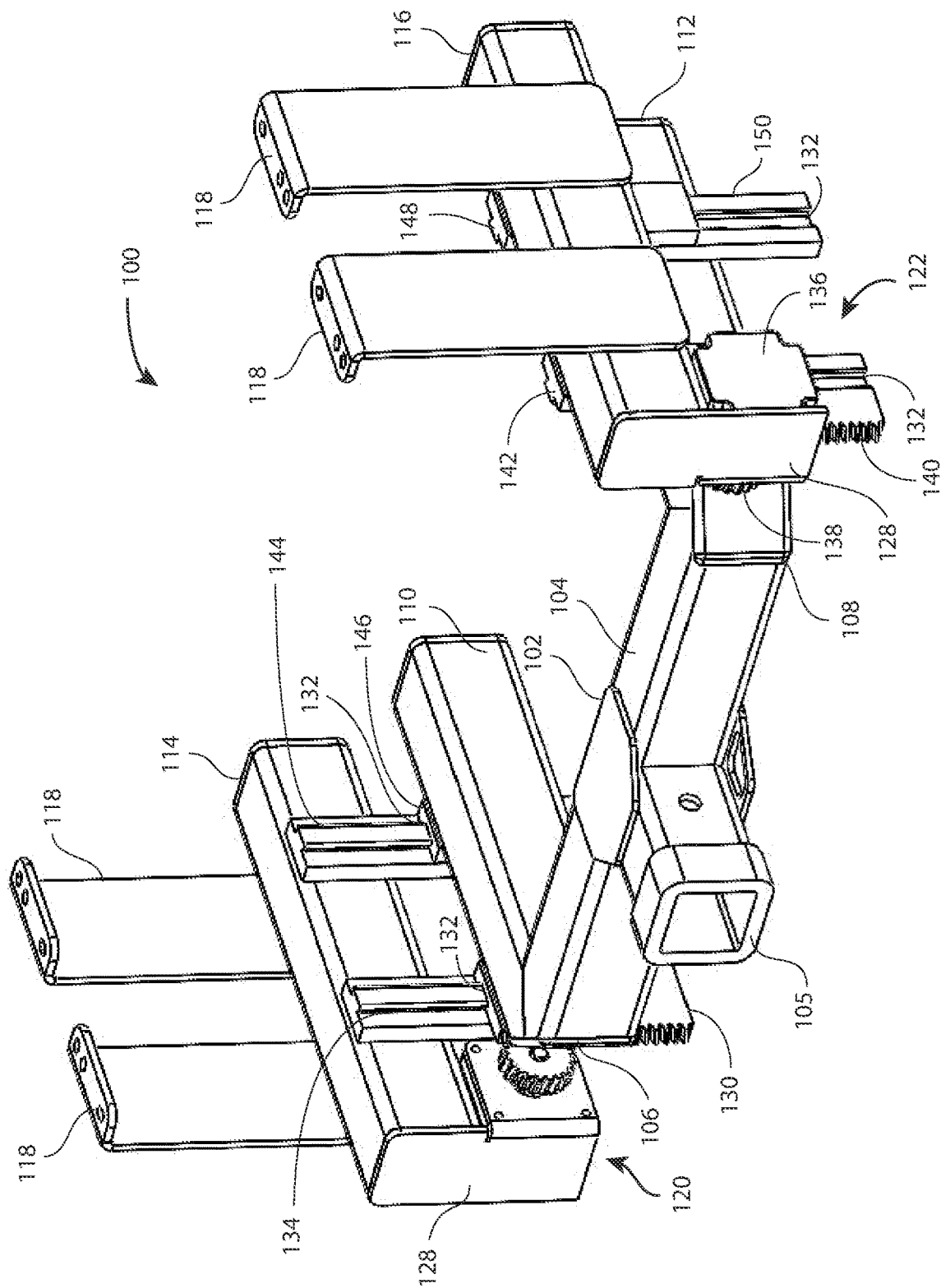
FIG. 2 is a perspective view of a hitch apparatus having a motor in a disengaged position.
Figure 3:
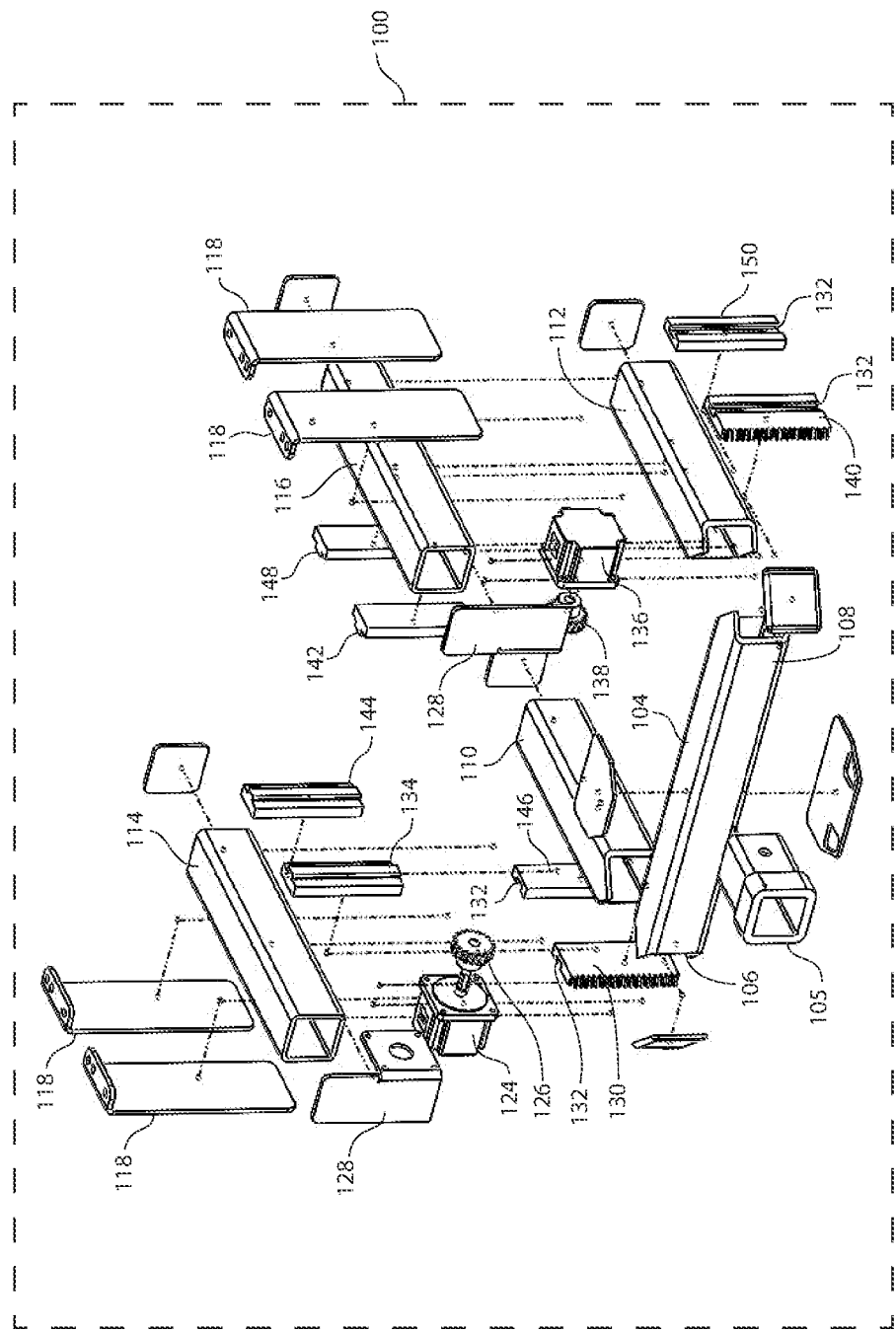
FIG. 3 is an exploded view of a hitch apparatus having a motor.

FIG. 1 is a perspective view of a hitch apparatus having a motor in an engaged position. FIG. 2 is a perspective view of a hitch apparatus having a motor in a disengaged position. FIG. 3 is an exploded view of a hitch apparatus having a motor. As illustrated in FIGS. 1 and 2, the hitch apparatus 100 may include a hitch arm 102. The hitch arm 102 forms a U-shape that aligns with the frame of the vehicle's rear (i.e., trunk section, tail gate section). The hitch arm 102 may be manufactured from a metal alloy, such as steel, iron, or other similar composites. In one or more embodiments, the hitch arm 102 may be hollow to reduce the weight of the hitch arm 102. In another embodiment, the hitch arm 102 may be solid (i.e., not hollow) to increase the tensile strength of the hitch arm 102. The density and dimension of the hitch arm 102 may vary depending on application.

The hitch arm 102 may include a cross member 104. The cross member 104 may form an elongated cube having a first end 106 and a second end 108 opposite the first end 106. Note, for clarity the first end 106 is not referenced in FIG. 1 but is referenced in FIG. 2. As illustrated in FIGS. 1 and 2, the first end 106 and the second end 108 may be truncated to allow space for the motor and gear (discussed below) to operate effectively. The cross member 104 is the section of the hitch apparatus 100 that runs parallel with the rear bumper of a vehicle.

As further illustrated in FIGS. 1 and 2, the cross member 104 may include a hitch receiver 105. The hitch receiver 105 is positioned along a center axis of the cross member 104. The hitch receiver 105 may be integrally coupled to the cross member 104. In another embodiment, the hitch receiver 105 may be coupled to the cross member 104 by welding or bolting. The hitch receiver 105 may form the shape and configuration of a standard hitch receiver coupled to a standard trailer hitch. That is, the hitch receiver 105 forms the shape of a hollow cube that allows a standard ball mount to be inserted and coupled into the hitch receiver 105. The hitch receiver 105 may be manufactured in varying dimensions dependent on application.

In one or more embodiments, the hitch arm 102 includes a first hitch member 110 adjacently coupled to the first end 106. Specifically, the first hitch member 110 may be coupled substantially perpendicular (i.e., within one, five, or ten degrees) with the first end 106 of the cross member 104. The first hitch member 110 may be coupled to the first end 106 by welding or by bolting. In another embodiment, the first hitch member 110 may be integrally coupled to the first end 106.

In one or more embodiments, the hitch arm 102 includes a second hitch member 112 adjacently coupled to the second end 108. Specifically, the second hitch member 112 may be coupled substantially perpendicular (i.e., within one, five, or ten degrees) with the second end 108 of the cross member 104. The second hitch member 112 may be coupled to the second end 108 by welding or by bolting. In another embodiment, the second hitch member 112 may be integrally coupled to the second end 108.

In one or more embodiments, the hitch apparatus 100 includes a first hitch frame 114. The first hitch frame 114 may be manufactured from a metal alloy, such as steel, iron, or other similar composites. In one more or embodiments, the first hitch frame 114 forms an elongated cube that runs parallel with the first hitch member 110. The length and height of the first hitch frame 114 may vary in dimension according to a vehicle's specifications. In one or more embodiments, the hitch apparatus 100 may include a second hitch frame 116. The second hitch frame 116 may be manufactured from a metal alloy, such as steel, iron, or other similar composites. In one or more embodiments, the second hitch frame 116 forms an elongated cube that runs parallel with the second hitch member 112. The length and height of the second hitch frame 116 may vary in dimension according to a vehicle's specifications.

As illustrated in FIGS. 1 and 2, the hitch apparatus 100 may be coupled to a vehicle (not illustrated) by mounting brackets 118. Although the mounting brackets 118 illustrated in FIGS. 1 and 2 depict an elongated strip of metal (or other similar composite) coupled to the first hitch frame 114 and second hitch frame 116, the mounting brackets 118 may form other complimentary shapes to accommodate the vehicle's frame structure.

As described above, FIG. 1 depicts the hitch apparatus 100 in an engaged position (i.e., the hitch arm 102 is in line with the first hitch frame 114 and the second hitch frame 116), and FIG. 2 depicts the hitch apparatus 100 in a disengaged position (i.e., the hitch arm 102 is not in line with but descended from the first hitch frame 114 and the second hitch frame 116). To disengage and engage the hitch apparatus 100, in one or more embodiments, the hitch apparatus 100 includes a first drive system 120 mechanically coupled to the hitch arm 102 and to the first hitch frame 114; and a second drive system 122 mechanically coupled to the hitch arm 102 and to the second hitch frame 116. Here, as illustrated in FIGS. 1 and 2 the first drive system 120 and the second drive system 122 are illustrated as being mechanically coupled to the first hitch member 110 and to the second hitch member 112 respectively.

In one or more embodiments, the first drive system 120 includes a first motor 124 having a first motor gear 126. The first motor 124 may be a twelve-volt electro-mechanical motor having a reversible torque feature allowing the motor to operate in two directions (i.e, reversible drive). The first motor gear 126 is the driving mechanism that is attached to the first motor 124 that forces the hitch arm 102 to ascend and descend when operating. The first motor gear 126 may be disc-shaped having a series of grooves or spurs positioned along the perimeter of the first motor gear 126. The first motor 124 may be coupled to the first hitch frame 114. In one or more embodiments, the first motor 124 is positioned below and coupled to the first hitch frame 114 by a bracket 128.

As illustrated in FIG. 1, but more clearly illustrated and referenced in FIGS. 2 and 3, the first drive system 120 may include a first gear track 130 coupled to the first hitch member 110 and to the first motor gear 126. The first gear track 130 may form a beam shape wherein one edge of the first gear track 130 has a series of teeth or spurs for coupling to the first motor gear 126. In addition, the first gear track 130 may include a groove 132.

In one or more embodiments, the first drive system 120 includes a first guide track 134. The first guide track 134 may be coupled to the first hitch frame 114. Further, the first guide track 134 may be coupled to the groove 132 of the first gear track 130 such that the groove 132 provides the passage and guidance for the hitch arm 102 to ascend and descend.

In one or more embodiments, the second drive system 122 includes a second motor 136 having a second motor gear 138. The second motor 136 may be a twelve-volt electro-mechanical motor having a reversible torque feature allowing the motor to operate in two directions (i.e., reversible drive). The second motor gear 138 is the driving mechanism that is attached to the second motor 136 that forces the hitch arm 102 to ascend and descend when operating. The second motor gear 138 may be disc-shaped having a series of grooves or spurs positioned along the perimeter of the second motor gear 138. The second motor 136 may be coupled to the second hitch frame 116. In one or more embodiments, the second motor 136 is positioned below and coupled to the second hitch frame 116 by a bracket 128.

As illustrated in FIG. 1, but more clearly illustrated and referenced in FIGS. 2 and 3, the second drive system 122 may include a second gear track 140 coupled to the second hitch member 112 and to the second motor gear 138. The second gear track 140 may form a beam shape wherein one edge of the second gear track 140 has a series of teeth or spurs for coupling to the second motor gear 138. In addition, the second gear track 140 may include a groove 132.

In one or more embodiments, the second drive system 122 includes a second guide track 142. The second guide track 142 may be coupled to the second hitch frame 116. Further, the second guide track 142 may be coupled to the groove 132 such that the groove 132 provides the passage and guidance for the hitch arm 102 to ascend and descend.

In one or more embodiments, as illustrated in FIG. 1, but more clearly illustrated and referenced in FIGS. 2 and 3, the first hitch frame 114 includes a third guide track 144. In addition, the first hitch member 110 has a third beam 146 that may be coupled to the third guide track 144. As illustrated in FIGS. 2 and 3, the third beam 146 has a groove 132. Further, the third guide track 144 may be coupled to the groove 132 (i.e., groove 132 in third beam 146) such that the groove 132 provides the passage and guidance for the hitch arm 102 to ascend and descend.

The second hitch frame 116 may have a fourth guide track 148. In one or more embodiments, the second hitch member 112 has a fourth beam 150 that may be coupled to the fourth guide track 148. As illustrated in FIGS. 2 and 3, the fourth beam 150 has a groove 132. Further, the fourth guide track 148 may be coupled to the groove 132 (i.e., groove 132 in fourth beam 150) such that the groove 132 provides the passage and guidance for the hitch arm 102 to ascend and descend.

Figure 4:
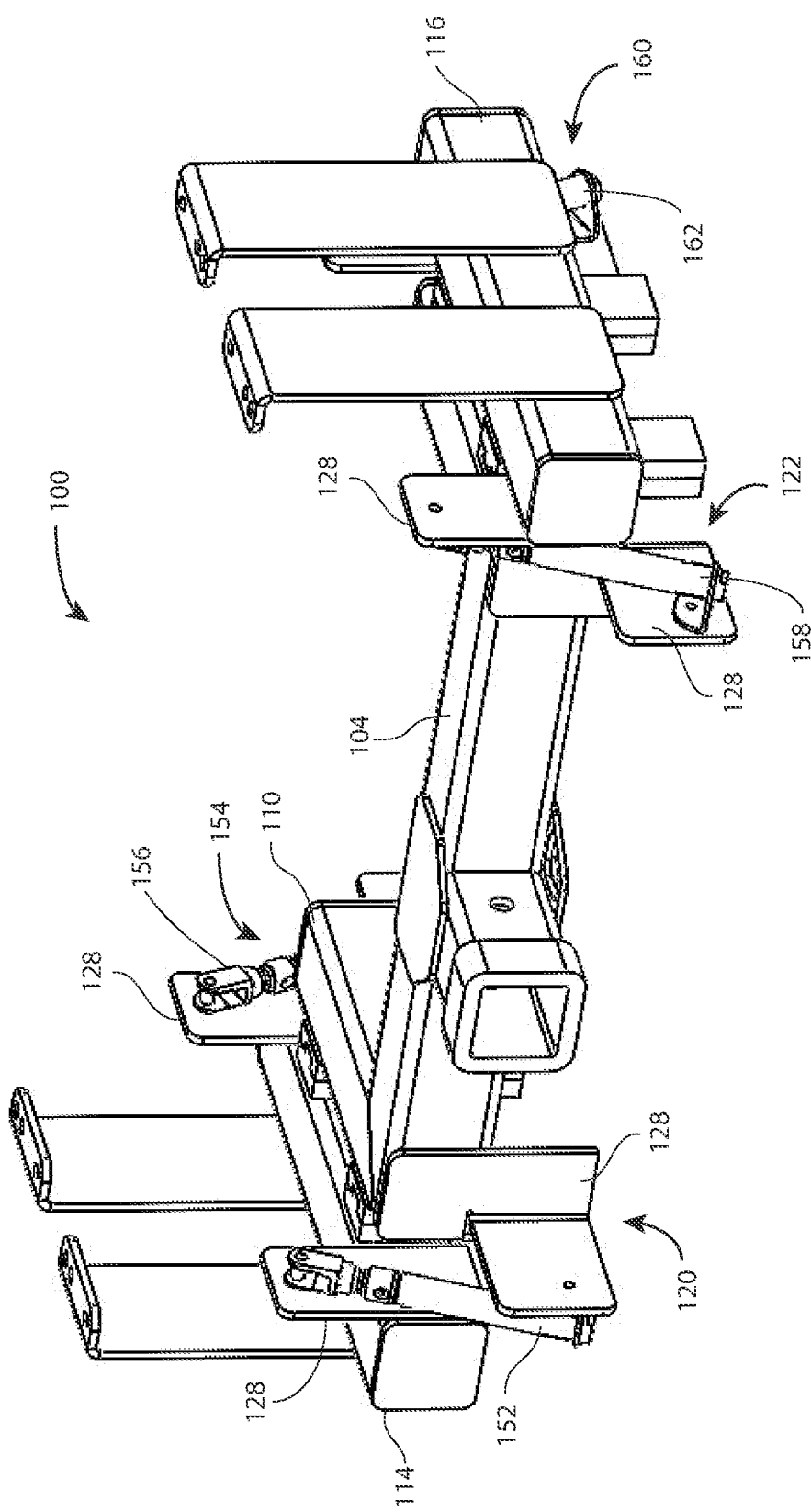
FIG. 4 is a perspective view of a hitch apparatus having extenders in an engaged position.
Figure 5:
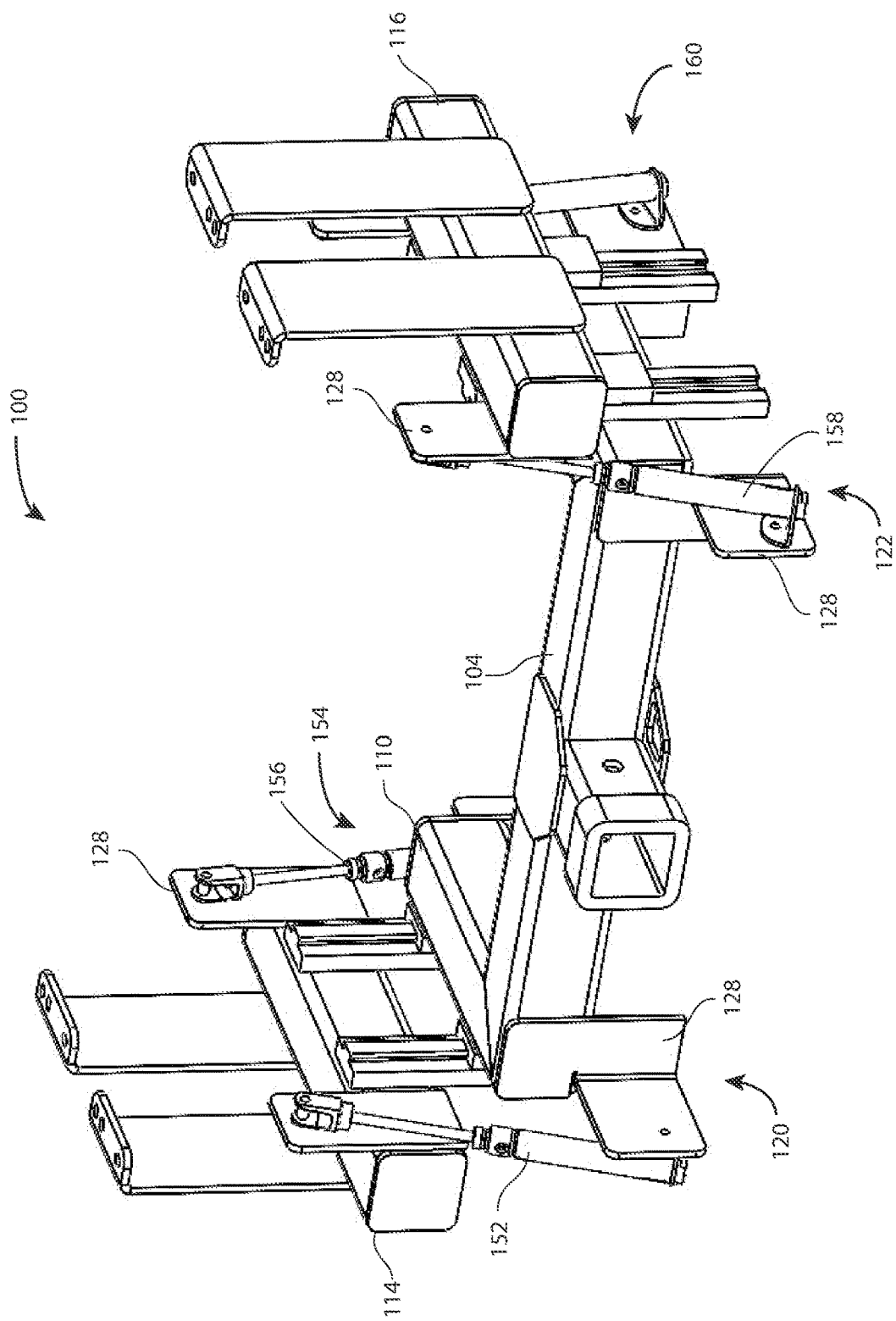
FIG. 5 is a perspective view of a hitch apparatus having extenders in a disengaged position.
Figure 6:
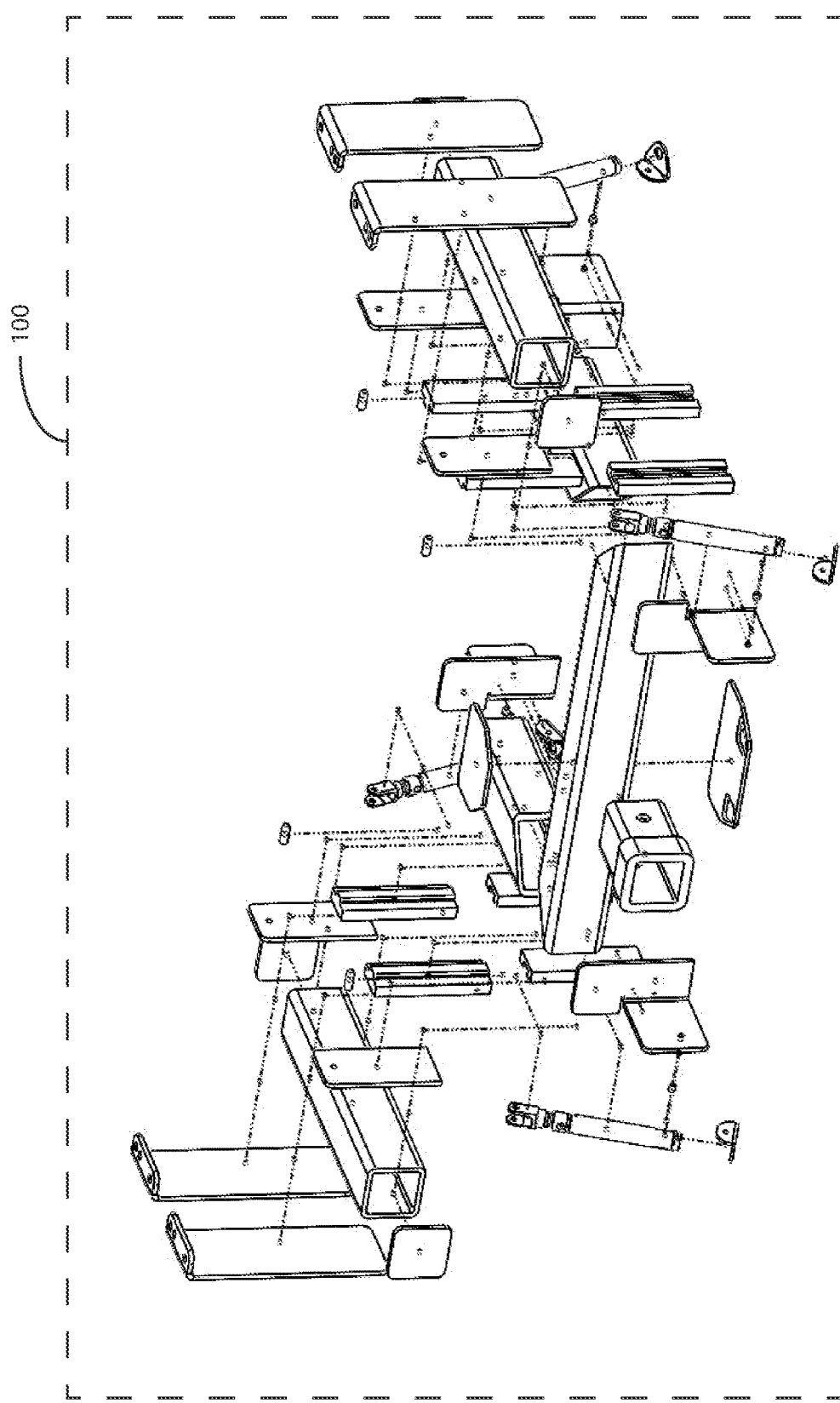
FIG. 6 is an exploded view of a hitch apparatus having extenders.

The hitch apparatus 100 may also operate by using different mechanical devices to force the hitch arm 102 to ascend and descend. For example, FIG. 4 is a perspective view of a hitch apparatus having extenders in an engaged position; FIG. 5 is a perspective view of a hitch apparatus having extenders in a disengaged position; and FIG. 6 is an exploded view of a hitch apparatus having extenders.

In one or more embodiments, as illustrated in FIGS. 4 and 5, the first drive system 120 includes a first extender 152 coupled to the cross member 104 and to the first hitch frame 114. The first extender 152 may be coupled directly to the cross member 104 by a bracket 128. Note, the first extender 152 may have a housing section and a rod section. Here, the housing section is coupled to the bracket 128 which in turn is coupled to the cross member 104. In one or more embodiments, the first extender 152 is coupled directly to the first hitch frame 114 by a bracket 128. Further, the rod portion is coupled to the bracket 128 which in turn is coupled to the first hitch frame 114.

The hitch apparatus 100, as illustrated in FIGS. 4 and 5, may include a third drive system 154. The third drive system 154 may include a second extender 156 coupled to the first hitch member 110 and the first hitch frame 114. Although not clearly illustrated in FIGS. 4 and 5, the second extender 156 comprises a housing section and a rod section. The housing section is coupled to a bracket 128 which in turn is coupled to the first hitch member 110. Conversely, the rod section of the second extender 156 is coupled directly to the first hitch frame 114 by a bracket 128. Here, the rod portion is coupled to the bracket 128 which in turn is coupled to the first hitch frame 114.

In one or more embodiments, as illustrated in FIGS. 4 and 5, the second drive system 122 includes a third extender 158 coupled to the cross member 104 and to the second hitch frame 116. The second extender 156 may be coupled directly to the cross member 104 by a bracket 128. Note, the second extender 156 may have a housing section and a rod section. Here, the housing section is coupled to the bracket 128 which in turn is coupled to the cross member 104. In one or more embodiments, the second extender 156 is coupled directly to the second hitch frame 116 by a bracket 128. Here, the rod portion is coupled to the bracket 128 which in turn is coupled to the second hitch frame 116.

The hitch apparatus 100, as illustrated in FIGS. 4 and 5, may include a fourth drive system 160. The fourth drive system 160 may include a fourth extender 162 coupled to the second hitch member 112 (not clearly shown in FIGS. 4 and 5) and to the second hitch frame 116. Although not clearly illustrated in FIGS. 4 and 5, the fourth extender 162 comprises a housing section and a rod section. The housing section is coupled to a bracket 128 which in turn is coupled to the second hitch member 112. Conversely, the rod section of the fourth extender 162 is coupled directly to the second hitch frame 116 by a bracket 128. Here, the rod portion is coupled to the bracket 128 which in turn is coupled to the second hitch frame 116.

In one or more embodiments, the first extender 152, second extender 156, third extender 158, and fourth extender 162 are comprised of a pneumatic system. The pneumatic system may include a pneumatic cylinder, intake filter, compressor, separator, receiver tank, and control valve for example. The pneumatic system may be controlled remotely by a computer that is accessed by an individual through a key fob, downloadable mobile app, electronic switch or button placed inside or outside the vehicle.

In one or more embodiments, the first extender 152, second extender 156, third extender 158, and fourth extender 162 are comprised of a hydraulic system. The hydraulic system may include a hydraulic actuator, a hydraulic pump, valves motor, reservoir, pipelines, filters, pressure regulator, accumulators, and a hydraulic power pack for example. The hydraulic system may be controlled remotely by a computer that is accessed by an individual through a key fob, downloadable mobile app, electronic switch or button placed inside or outside the vehicle.

In one or more embodiments, the first extender 152, second extender 156, third extender 158, and fourth extender 162 are comprised of a push-rod system. The push-rod system may include a twelve-volt direct current motor and a threaded shaft. The push-rod system may be controlled remotely by a computer that is accessed by an individual through a key fob, downloadable mobile app, electronic switch or button placed inside or outside the vehicle.

FIG. 7 is an aerial view of a hitch apparatus coupled to a vehicle frame. FIG. 8 is a profile view of a hitch apparatus coupled to a vehicle frame. As illustrated in FIGS. 7 and 8, the hitch apparatus 100 is coupled to a vehicle frame 164. Specifically, the hitch apparatus 100 is coupled to the rear portion of the vehicle frame 164 by its hitch frames (i.e., first hitch frame 114 and second hitch frame 116) and or its mounting brackets 118.

In one or more embodiments, the hitch apparatus 100 may include locking actuators 166. When the hitch arm 102 is in the engaged position, an individual may engage the actuators electronically through a key fob, downloadable software, or manually to secure the hitch arm 102 to the first hitch frame 114 and the second hitch frame 116. Thus, the actuators may be comprised of an actuator body (i.e., housing) and an internal locking pin that, when activated by an energy source such as a motor, is pushed into a bore in the hitch frames (i.e., first hitch frame 114 and second hitch frame 116) locking the hitch arm 102 into place.

As further illustrated in FIGS. 7 and 8, the hitch apparatus may include a ball mount 168 coupled to the hitch receiver 105. The ball mount 168 comprises a shank and a trailer ball platform that is couplable to a trailer coupler. The ball mount 168 may be manufactured in varying sizes depending on application. The ball mount 168 may be inserted into the hitch receiver 105 and secured by a hitch pin (not illustrated).

Figure 9:
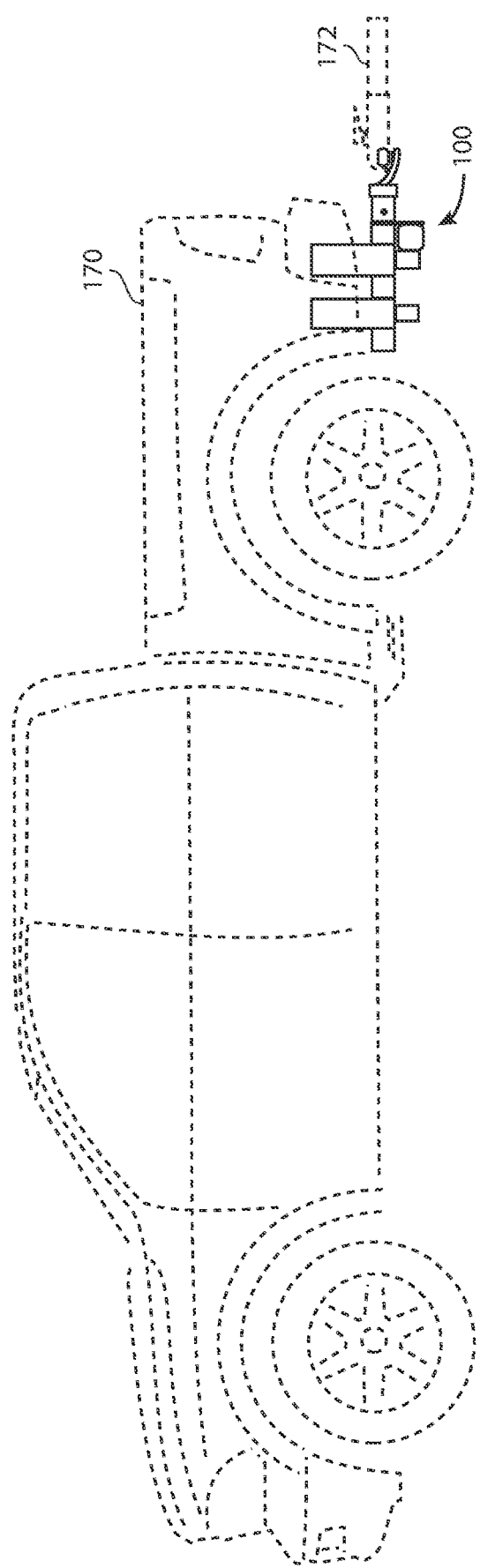
FIG. 9 is a profile view of a hitch apparatus coupled to a vehicle and to a trailer coupler.

FIG. 9 is a profile view of a hitch apparatus coupled to a vehicle and to a trailer coupler. As illustrated in FIG. 9, the hitch apparatus 100 is coupled to a vehicle frame 164 (Note, the vehicle frame is not illustrated in FIG. 9 for clarity) which is coupled to a vehicle 170. Although FIG. 9 schematically illustrates a truck, the hitch apparatus 100 may be coupled to various mobile vehicles such as a car, a van, a sports utility vehicle, a four-wheeler, etc. The hitch apparatus 100 may be manufactured in various dimensions to complement its application. Here, in FIG. 9, the hitch apparatus 100 is illustrated in the disengaged position, which allows an individual to couple the hitch apparatus 100 with a trailer coupler 172.

Figure 10:
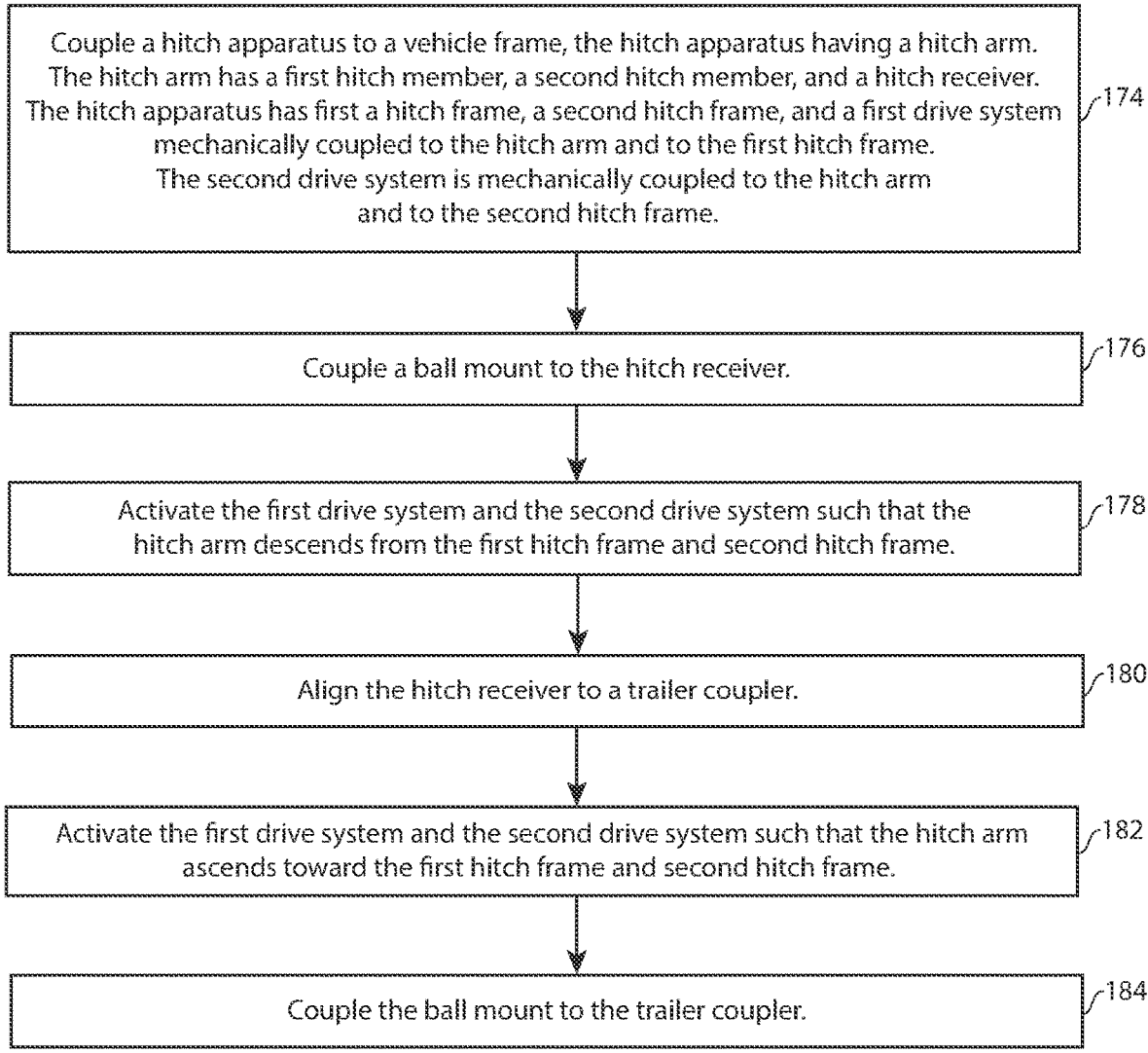
FIG. 10 is a flow chart illustrating the method of coupling a hitch apparatus to a trailer coupler.

FIG. 10 is a flow chart illustrating the method of coupling a hitch apparatus to a trailer coupler. Note, FIG. 10 does not describe all the elements of each embodiment, rather how the embodiment operates with one another. In operation, however, a hitch apparatus (such as hitch apparatus 100) is coupled to a vehicle frame (such as vehicle frame 164). The hitch apparatus (such as hitch apparatus 100) has a hitch arm (such as hitch arm 102). The hitch arm (such as hitch arm 102) has a cross member (such as cross member 104) having a first end (such as first end 106) and a second end (such as second end 108). The hitch arm (such as hitch arm 102)

includes a first hitch member (such as first hitch member 110) adjacently coupled to the first end (such as first end 106), a second hitch member (such as second hitch member 112) adjacently coupled to the second end (such as second end 108), and a hitch receiver (such as hitch receiver 105) coupled to the cross member (such as cross member 104). The hitch apparatus (such as hitch apparatus 100) includes a first hitch frame (such as first hitch frame 114), a second hitch frame (such as second hitch frame 116), a first drive system (such as first drive system 120) mechanically couped to the hitch arm (such as hitch arm 102) and to the first hitch frame (such as first hitch frame 114), and a second drive system (such as second drive system 122) mechanically coupled to the hitch arm (such as hitch arm 102) and to the second hitch frame (such as second hitch frame 116) (block 174). A ball mount (such as ball mount 168) is coupled to the hitch receiver (such as hitch receiver 105) (block 176). The first drive system (such as first drive system 120) and the second drive system (such as second drive system 122) are activated such that the hitch arm (such as hitch arm 102) descends from the first hitch frame (such as first hitch frame 114) and second hitch frame (116) (block 178). The hitch receiver (such as hitch receiver 105) is aligned with the trailer coupler (such as trailer coupler 172) (block 180). The first drive system (such as first drive system 120) and the second drive system (such as second drive system 122) are activated such that the hitch arm (such as hitch arm 102) ascends toward the first hitch frame (such as first hitch frame 114) and second hitch frame (116) (block 182). The ball mount (such as ball mount 168) is coupled to the trailer coupler (such as trailer coupler 172) (block 184).

Implementations may include one or more of the following. An apparatus may include a hitch arm having a cross member having a first end and a second end. A first hitch member may be adjacently coupled to the first end. A second hitch member may be adjacently coupled to the second end. A hitch receiver may be coupled to the cross member. The apparatus may include a first hitch frame and a second hitch frame. A first drive system may be mechanically coupled to the hitch arm and to the first hitch frame. A second drive system may be coupled to the hitch arm and to the second hitch frame.

In one aspect, the first drive system includes a first motor having a first motor gear coupled to the first hitch frame. A first gear track is coupled to the first hitch member and to the first motor gear. The first gear track has a groove. A first guide track is coupled to the first hitch frame and to the groove. The second drive system includes a second motor having a second motor gear coupled to the second hitch frame. A second gear track is coupled to the second hitch member and to the second motor gear. The second gear track has a groove. A second guide track is coupled to the second hitch frame and to the groove. The first hitch frame has a third guide track. The first hitch member has a third beam coupled to the third guide track. The second hitch frame has a fourth guide track. The second hitch member has a fourth beam coupled to the fourth guide track. The first drive system includes a first extender coupled to the cross member and to the first hitch frame. A third drive system has a second extender coupled to the first hitch member and to the first hitch frame. The second drive system includes a third extender coupled to the cross member and second hitch frame. A fourth drive system has a fourth extender coupled to the second hitch member and to the second hitch frame.

Implementations may include one or more of the following. A system includes a motor having a vehicle frame. A hitch apparatus is coupled to the vehicle frame. The hitch apparatus includes a hitch arm having a cross member having a first end and a second end. A first hitch member is adjacently coupled to the first end. A second hitch member is adjacently coupled to the second end. A hitch receiver is coupled to the cross member. The hitch apparatus includes a first hitch frame and a second hitch frame. A first drive system is mechanically coupled to the hitch arm and to the first hitch frame. A second drive system is mechanically coupled to the hitch arm and to the second hitch frame.

In one aspect, the first drive system includes a first motor having a first motor gear coupled to the first hitch frame. A first gear track is coupled to the first hitch member and to the first motor gear. The first gear track has a groove. A first guide track is coupled to the first hitch frame and to the groove. The second drive system includes a second motor having a second motor gear coupled to the second hitch frame. A second gear track is coupled to the second hitch member and to the second motor gear. The second gear track has a groove. A second guide track is coupled to the second hitch frame and to the groove. The first hitch frame has a third guide track. The first hitch member has a third beam coupled to the third guide track. The second hitch frame has a fourth guide track. The second hitch member has a fourth beam coupled to the fourth guide track. The first drive system includes a first extender coupled to the cross member and to the first hitch frame. A third drive system has a second extender coupled to the first hitch member and to the first hitch frame. The second drive system includes a third extender coupled to the cross member and second hitch frame. A fourth drive system has a fourth extender coupled to the second hitch member and to the second hitch frame.

Implementations may include one or more of the following. A method may include coupling a hitch apparatus to a vehicle frame. The hitch apparatus may have a hitch arm. The hitch arm may have a cross member having a first end and a second end. A first hitch member may be adjacently coupled to the first end. A second hitch member may be adjacently coupled to the second end. A hitch receiver may be adjacently coupled to the cross member. The hitch apparatus may include a first hitch frame and a second hitch frame. A first drive system may be mechanically coupled to the hitch arm and to the first hitch frame. A second drive system may be mechanically coupled to the hitch arm and to the second hitch frame. A ball mount may be coupled to the hitch receiver. The first drive system may be activated such that the hitch arm descends from the first hitch frame and second hitch frame. The hitch receiver may be aligned to a trailer coupler. The first drive system and second drive system may be activated such that the hitch arm ascends toward the first hitch frame and the second hitch frame. The ball mount may be coupled to the trailer coupler.

In one aspect, the first drive system includes a first motor having a first motor gear coupled to the first hitch frame. A first gear track is coupled to the first hitch member and to the first motor gear. The first gear track has a groove. A first guide track is coupled to the first hitch frame and to the groove. The second drive system includes a second motor having a second motor gear coupled to the second hitch frame. A second gear track is coupled to the second hitch member and to the second motor gear. The second gear track has a groove. A second guide track is coupled to the second hitch frame and to the groove. The first hitch frame has a third guide track. The first hitch member has a third beam coupled to the third guide track. The second hitch frame has a fourth guide track. The second hitch member has a fourth beam coupled to the fourth guide track. The first drive system includes a first extender coupled to the cross member and to the first hitch frame. A third drive system has a second extender coupled to the first hitch member and to the first hitch frame. The second drive system includes a third extender coupled to the cross member and second hitch frame. A fourth drive system has a fourth extender coupled to the second hitch member and to the second hitch frame.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
    a hitch arm having:
        a cross member having a first end and a second end;
        a first hitch member adjacently coupled to the first end;
        a second hitch member adjacently coupled to the second end; and
        a hitch receiver coupled to the cross member;
    a first hitch frame;
    a second hitch frame; and
    a first drive system mechanically coupled to the hitch arm and to the first hitch frame, the first drive system having a first extender coupled to the cross member and to the first hitch frame;
    a second drive system mechanically coupled to the hitch arm and to the second hitch frame; and
    a third drive system having a second extender coupled to the first hitch member and to the first hitch frame.

2. The apparatus of claim 1 wherein the second drive system comprises a third extender coupled to the cross member and second hitch frame.

3. The apparatus of claim 2 further comprising a fourth drive system having a fourth extender coupled to the second hitch member and to the second hitch frame.

4. A system comprising:
    a mobile vehicle having a vehicle frame;
    a hitch apparatus coupled to the vehicle frame, the hitch apparatus having:
        a hitch arm having:
            a cross member having a first end and a second end;
            a first hitch member adjacently coupled to the first end;
            a second hitch member adjacently coupled to the second end; and
            a hitch receiver coupled to the cross member;
        a first hitch frame;
        a second hitch frame; and
        a first drive system mechanically coupled to the hitch arm and to the first hitch frame, the first drive system having a first extender coupled to the first hitch member and to the first hitch frame; and
        a second drive system mechanically coupled to the hitch arm and to the second hitch frame; and
        a third drive system having a second extender coupled to the first hitch member and to the first hitch frame.

5. The system of claim 4 wherein the second drive system comprises:
    a third extender coupled to the second hitch member and to the second hitch frame.

6. The system of claim 5 further comprising a fourth drive system having a fourth extender coupled to the second hitch member and to the second hitch frame.

7. A method comprising:
    coupling a hitch apparatus to a vehicle frame, the hitch apparatus having:
        a hitch arm having:
            a cross member having a first end and a second end;
            a first hitch member adjacently coupled to the first end;
            a second hitch member adjacently coupled to the second end; and
            a hitch receiver coupled to the cross member;
        a first hitch frame;
        a second hitch frame; and
        a first drive system mechanically coupled to the hitch arm and to the first hitch frame, the first drive system having a first extender coupled to the first hitch member and to the first hitch frame; and
        a second drive system mechanically coupled to the hitch arm and to the second hitch frame; and
        a third drive system having a second extender coupled to the first hitch member and to the first hitch frame;
    coupling a ball mount to the hitch receiver;
    activating the first drive system and second drive system such that the hitch arm descends from the first hitch frame and second hitch frame;
    aligning the hitch receiver to a trailer coupler;
    activating the first drive system and second drive system such that the hitch arm ascends toward the first hitch frame and second hitch frame; and
    coupling the ball mount to the trailer coupler.

8. The method of claim 7 wherein the second drive system comprises:
    a third extender coupled to the second hitch member and to the second hitch frame.

9. The method of claim 8 further comprising a fourth drive system having a fourth extender coupled to the second hitch member and to the second hitch frame.

* * * * *